United States Patent [19]

Nonnenmann et al.

[11] 4,436,245
[45] Mar. 13, 1984

[54] PNEUMATIC CONTROL SYSTEM, ESPECIALLY FOR VEHICLE HEATING SYSTEMS

[75] Inventors: Manfred Nonnenmann, Schwieberdingen; Steffi Deuschle, Fellback, both of Fed. Rep. of Germany

[73] Assignee: Süddeutsche Kühlerfabrik Julius Fr. Behr GmbH & Co. KG, Stuttgart, Fed. Rep. of Germany

[21] Appl. No.: 372,545

[22] Filed: Apr. 28, 1982

Related U.S. Application Data

[63] Continuation-in-part of Ser. No. 235,662, Feb. 18, 1981, abandoned, which is a continuation of Ser. No. 87,984, Oct. 25, 1979, abandoned.

[51] Int. Cl.³ .............................................. F24F 13/10
[52] U.S. Cl. ...................................... 236/49; 60/409; 60/412; 236/84; 417/18
[58] Field of Search ............. 236/84, 49; 165/42; 417/14, 18; 60/409, 412; 251/12

[56] References Cited

U.S. PATENT DOCUMENTS

| | | | |
|---|---|---|---|
| 2,629,537 | 2/1953 | Graybrook et al. | 417/18 |
| 3,120,103 | 2/1964 | Beard et al. | 60/432 X |
| 3,153,325 | 10/1964 | Thorner | 60/409 |
| 3,263,427 | 8/1966 | Childs | 60/409 |
| 3,305,176 | 2/1967 | Brace | 236/84 X |
| 3,411,704 | 11/1968 | Hilgert et al. | 236/84 X |
| 3,576,292 | 4/1971 | Block | 236/84 X |
| 3,693,706 | 9/1972 | Nisley et al. | 165/23 |
| 3,947,156 | 3/1976 | Becker | 417/413 X |
| 4,262,738 | 4/1981 | Kato et al. | 236/84 X |

*Primary Examiner*—William E. Tapolcai
*Attorney, Agent, or Firm*—Barnes & Thornburg

[57] ABSTRACT

A control system for controlling the operation of a heating or air conditioning system, especially for the passenger compartment of motor vehicles. The temperature in the compartment is maintained by an electronic controller which receives temperature-related signals from one or more temperature sensors. The electronic controller is connected to an air pump which may be operated as a source of pressure or vacuum and is coupled to a pneumatic actuator which moves a final control element, for example an air flow valve or a cooling water valve. The air pump supplies a continuous and reliable source of pressure or vacuum independently of the engine manifold vacuum. The air control conduit is coupled to a ventilating line which communicates with the atmosphere through a fixed or variable throttle.

10 Claims, 5 Drawing Figures

PNEUMATIC CONTROL SYSTEM, ESPECIALLY FOR VEHICLE HEATING SYSTEMS

REFERENCE TO RELATED APPLICATIONS

This application is a Continuation-In-Part of application Ser. No. 235,662 filed Feb. 18, 1981, which was in turn a continuation of application Ser. No. 87,984 filed Oct. 25, 1979; both now abandoned.

FIELD OF THE INVENTION

The invention relates to a heating system, especially for motor vehicles in which the temperature is maintained by a closed control loop under pneumatic actuation. The system includes temperature sensors which feed signals to an electronic controller that engages at least one actuator for changing the hot or cold air supply or the water supply to the heating system so as to maintain a preselected temperature.

BACKGROUND OF THE INVENTION AND PRIOR ART

An electro-pneumatic control system for the temperature control of motor vehicles is known, for example, from the British Pat. No. 1,205,946. The apparatus described there includes a pneumatic actuator which engages a servo valve. The compressed air for actuating the servo motor is generated by an air pump that is controlled via an electro-pneumatic relay. The pressure prevailing in the actuator is sensed by a bellows whose signal is a feedback signal for the electro-pneumatic relay permitting a comparison by means of a system of levers referred to magnetic force which depends on a sensor signal. The system of levers actuates an electro-pneumatic contact which turns the air pump on and off or opens and closes the air pressure system.

In the known apparatus, the air pump operates only intermittently, which has a detrimental effect on the control pressure which in turn causes disturbances in the overall control behavior. Furthermore, it is possible to excite the servomotor and the actuator into a state of oscillation.

Another apparatus which uses a temperature-dependent electronic control is known from the British Pat. No. 1,397,426. In this known apparatus, solenoid valves are controlled by relays or transistors to control the generally available vehicle vacuum. However, in this and similar systems, in which use is made of the prevailing engine vacuum which is modulated to engage a servo-actuator, two serious disadvantages arise. Firstly, the manifold pressure of the engine varies within the operational domain of the engine, causing erratic behavior of the pneumatic control system which uses the vacuum. Secondly, the use of the engine vacuum for control purposes tends to have deleterious effects on other vehicle systems, especially the carburetor if present.

In still other cases, especially in Diesel engine equipped vehicles, the available vacuum may be insufficient for any control purpose.

OBJECT AND SUMMARY OF THE INVENTION

Accordingly, it is a principal object of the present invention to provide a control system for controlling the temperature in the passenger compartment of motor vehicles by the use of an electro-pneumatic actuating system which operates independently of engine vacuum. It is an associated object of the invention to provide a temperature control system which is relatively simple in construction and operates continuously.

These and other objects are attained according to the invention by providing a control system which includes an air pump that is under constant control of an electronic controller. The pneumatic control line communicates with a secondary line, open to the atmosphere, and the electronic controller regulates the volumetric rate of the air pump.

In a variant of the invention, the aforementioned objects are attained in that the signal from the controller is applied to the air pump when the actuator is to be moved in one of its two operational directions while the signals are applied to a ventilating valve when the actuator is to be moved in the opposite operational direction.

A conspicuous advantage of the invention, especially compared with the aperture described in the aforementioned British Pat. No. 1,205,946, is the absence of an electro-pneumatic pressure converter. The resulting simplicity reduces the probability of failure and reduces the cost of construction. The continuous, as opposed to intermittent, operation of the air pump according to the invention further improves the overall control characteristics of the system.

The use of an independent air pump makes it possible to generate a relatively high vacuum (low pressure) which in turn permits the use of smaller actuator cells than would be possible if engine vacuum had to be employed.

In one advantageous embodiment of the invention, the air pump is a pressure pump, i.e., a pump producing higher than atmospheric pressure, which further reduces the required dimensions of the actuator cells.

In a further feature of the invention, the air pump is a per se known immersion armature diaphragm air pump having a coil which is electrically connected with the electronic controller for the purpose of changing the pump frequency or the amplitude of its stroke.

In a variant of the invention, the air pump may be embodied as an eccentrically driven diaphragm pump and the electronic controller controls the volumetric rate of the pump by regulating the speed of an electric drive motor. The ventilating valve or means for the control circuit may advantageously be a fixed throttle. In another embodiment of the invention, the ventilating means may be an electro-magnetic valve. Suitably, the air supply line of the control system includes a check valve tending to maintain the prevailing pressure in the control line.

The actuator may be advantageously coupled with a feedback signal transducer, for example a potentiometer, for supplying a signal to the controller which indicates the position of the final control element.

Still other advantages, characteristics and features of the invention will emerge from the following detailed description of a number of preferred embodiments which relate to the drawing.

DESCRIPTION OF THE PREFERRED EMBODIMENTS

Figure 1:
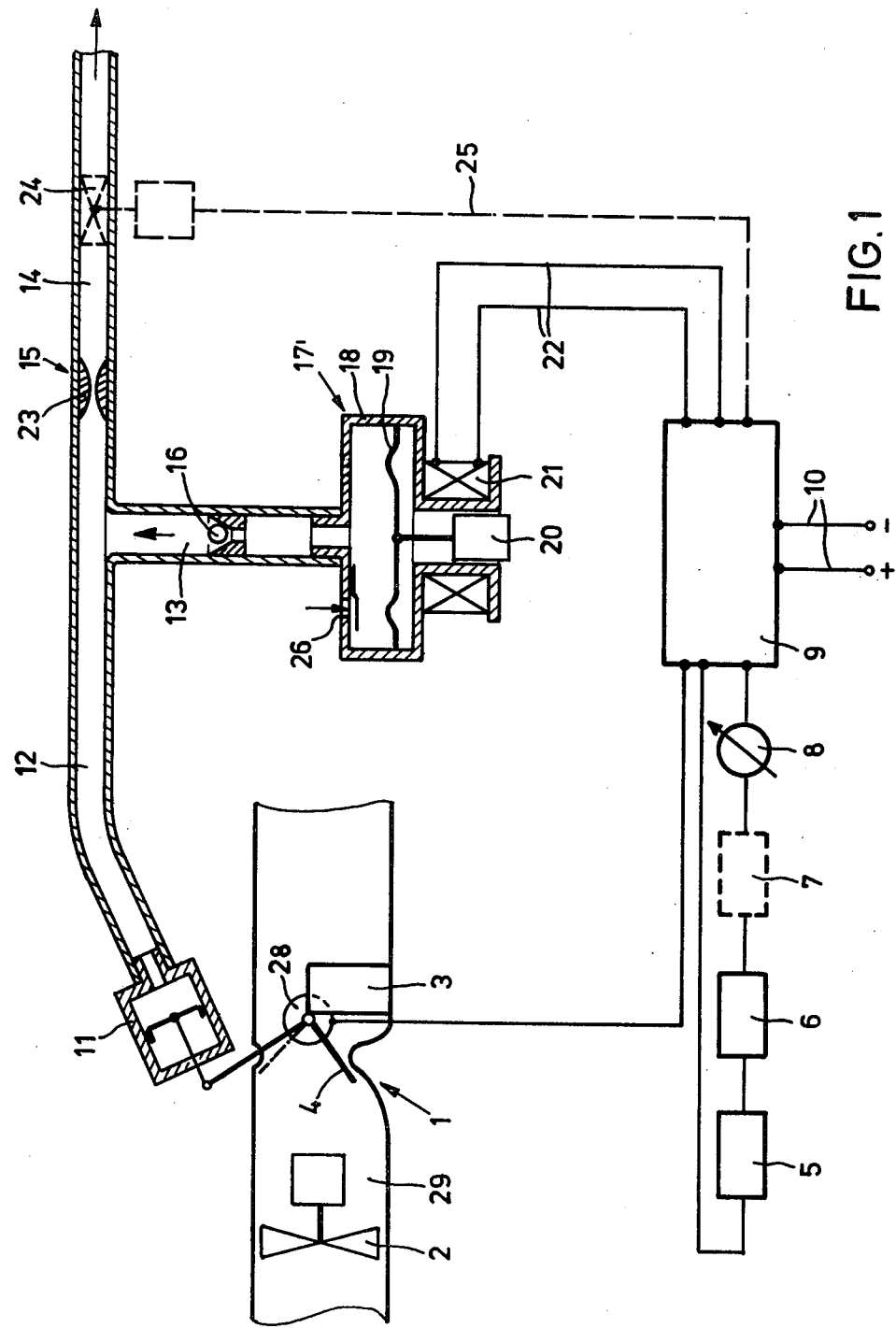
FIG. 1 is a schematic illustration of a first embodiment of the invention in which the control pressure is super-atmospheric.

In the first embodiment of the invention illustrated in FIG. 1, the heating or air conditioning ducts 1 of the motor vehicle include a main air channel 29 which may typically include an air fan 2 and a heat exchanger 3. In a preferably reduced cross section of the conduit 29, there is disposed an air flow control valve 4, illustrated in this embodiment as a pivoting flap, the position of which causes the air flow to pass partly or entirely through the heat exchanger 3 or to bypass it. The pivotal position of the air flap 4 is determined by the operating position of the movable part of a final control element 11, embodied here as a pneumatic actuator 11 acting via suitable linkage. The actuator 11 is connected to a pneumatic conduit 12 which communicates with a conduit 13 containing a check valve 16. The conduit 13 is connected to an air pump 17'. In the embodiment shown in FIG. 1, the air pump 17' is a per se known immersion armature diaphragm air pump having an armature 20 which moves in the center of an electromagnetic coil 21. Depending on the excitation of the coil 21, the armature 20 enters the space in the coil 21 to varying extent. The motion of the armature 20 is transmitted to the diaphragm 19 which generates air pressure in the chamber 18 due to the action of an inlet valve 26 which pevents the egress of air from the chamber 18. The controller 9 supplies power to the coil 21 through electrical lines 22; the electric power may be obtained, for example, from the vehicle battery through supply lines 10.

In order to perform its control functions, the controller receives signals from a number of temperature sensors 5, 6, 7. For example, the sensor 5 may be an external temperature sensor, the sensor 6 may be an internal temperature sensor and the optional temperature sensor 7 may be disposed behind the heat exchanger 3 to measure the temperature of the air in the immediate vicinity thereof. Suitably, the sensor circuit includes a set-point control 8 which permits the occupants of the passenger compartment to preselect a desired ambient temperature.

Figure 4:
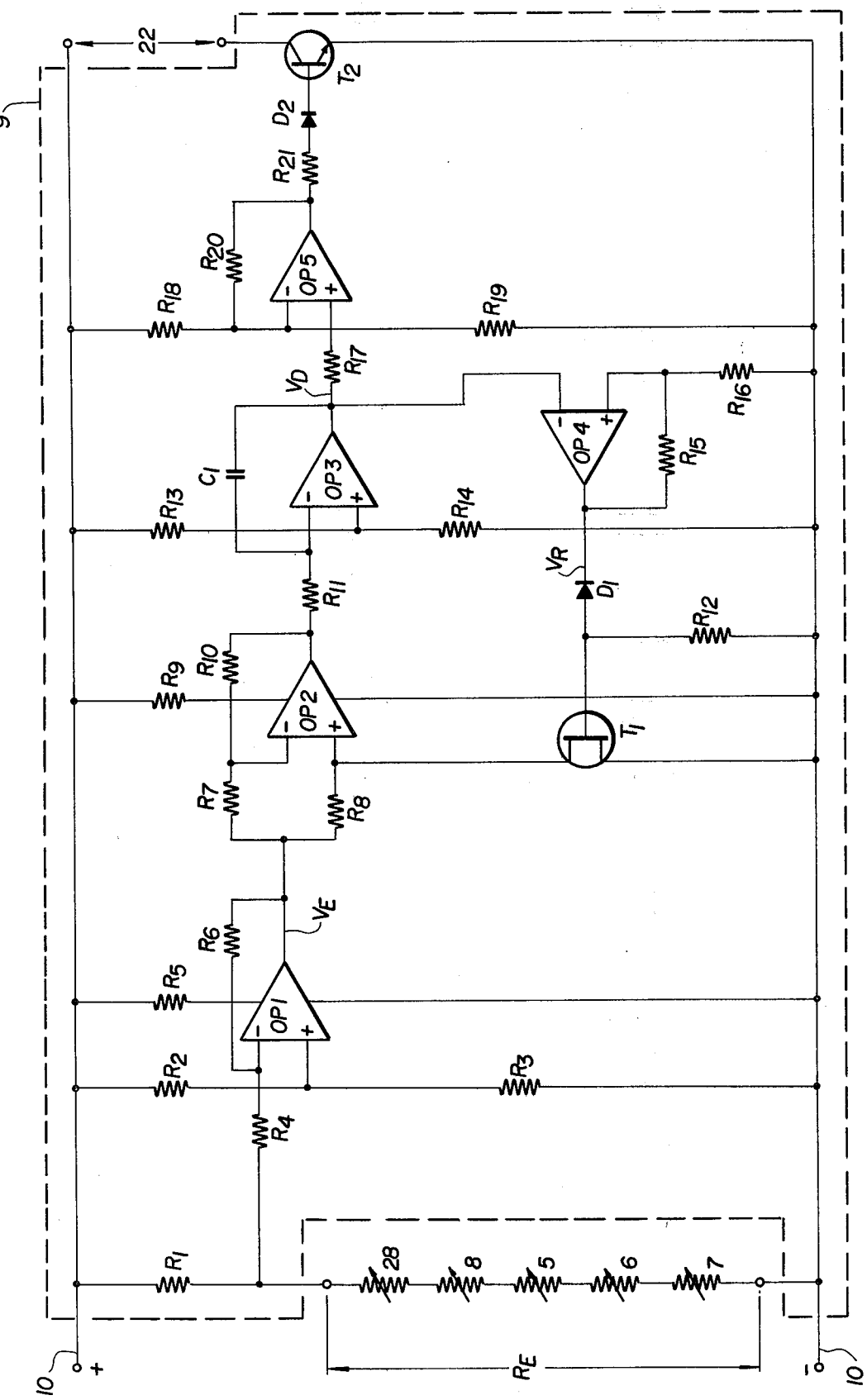
FIGS. 4 and 5 are circuit diagrams of two embodiments of controllers which are usable with the present invention.
Figure 5:
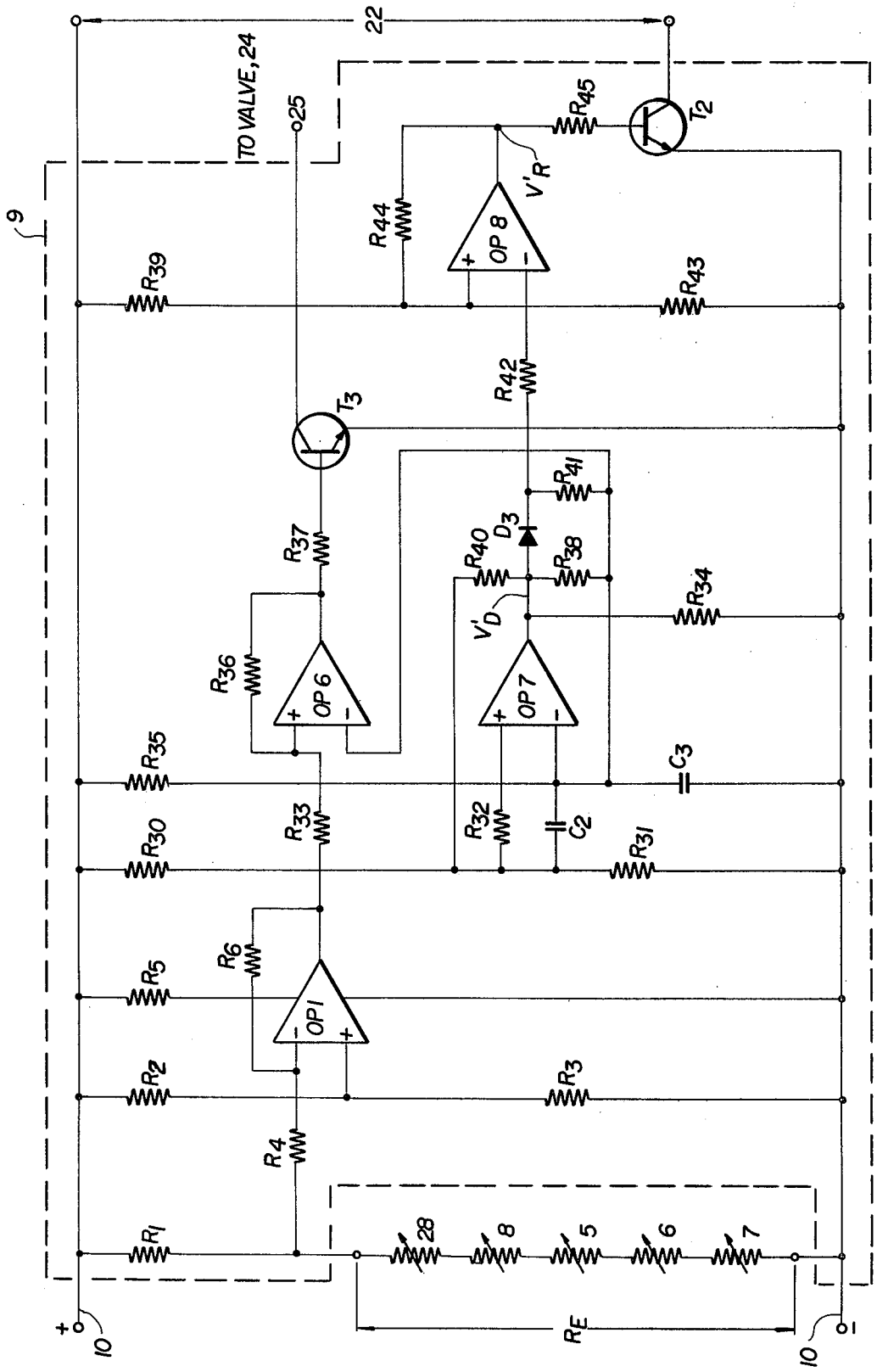

A description of an electronic controller 9 suitable for use in the present system is contained, for example, in the British Pat. No. 1,397,426, and other embodiments are described below herein and are shown in FIGS. 4 and 5.

The air control conduit 12 is seen to be extended as a branch conduit 14 containing a location of reduced cross section 15, embodied for example as a fixed throttle 23. However, the cross section of the conduit 14 may also be changed continuously by, for example, an electromagnetic valve 24 under the control of the controller 9 via a line 25.

Figure 2:
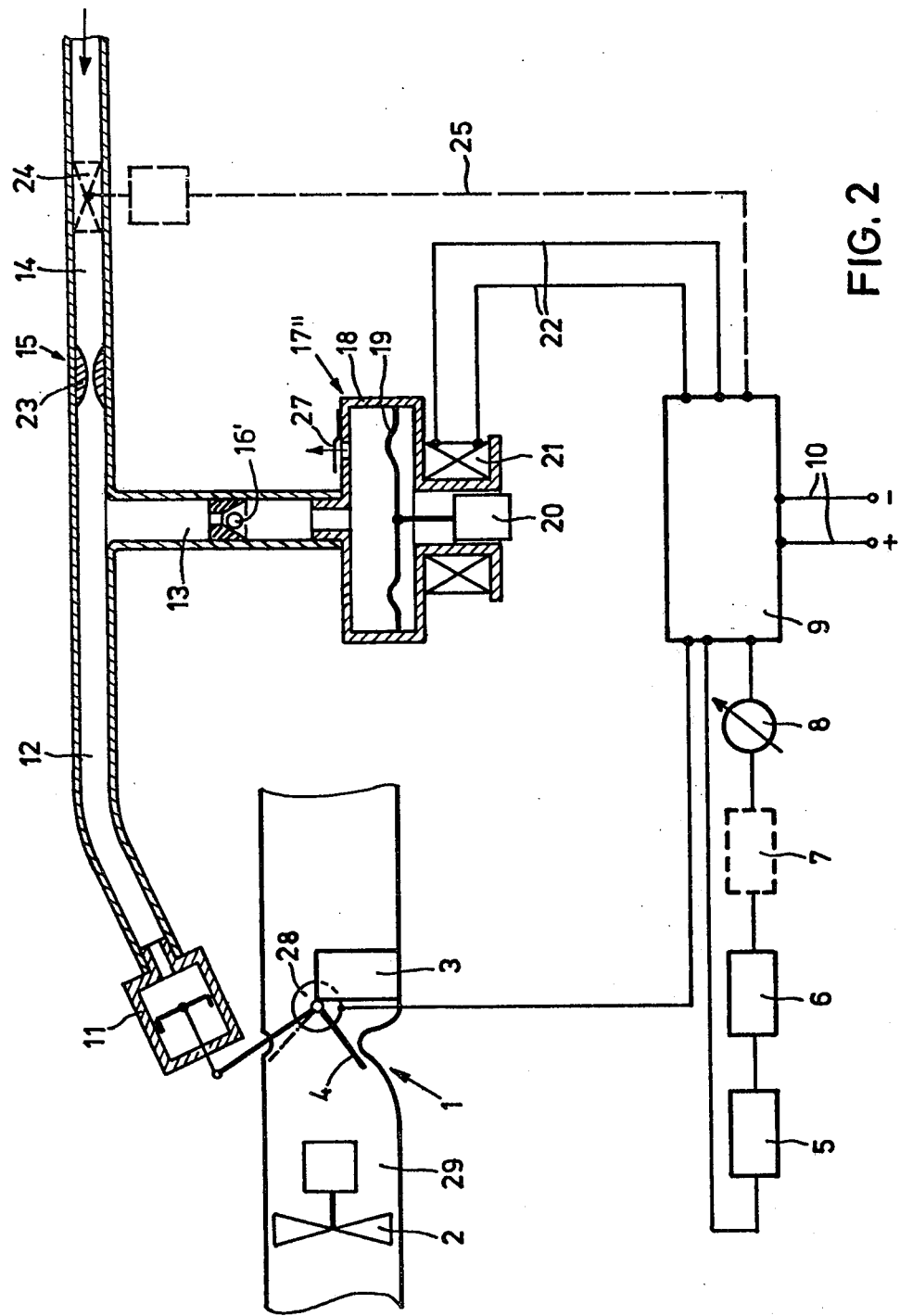
FIG. 2 illustrates a second embodiment of the invention in which the control pressure is sub-atmospheric.
Figure 3:
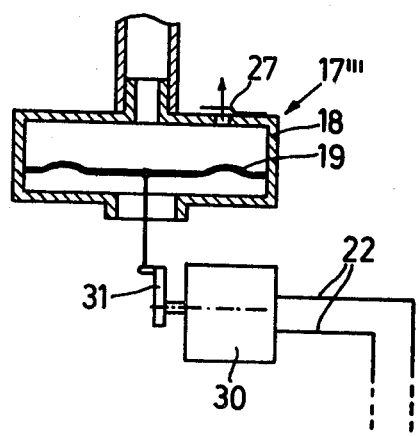
FIG. 3 is a diagram of a mechanically driven air pump.

In a second embodiment of the invention, illustrated in FIG. 2, the air supply pump 17" is embodied as a vacuum pump due to the deposition of a one-way outlet valve 27 in place of the inlet valve 26 of the embodiment of FIG. 1. Accordingly, the check valve 16' functions in the opposite sense of the check valve 16 of FIG. 1. In all other respects, the embodiment of FIG. 2 is identical to that of FIG. 1.

The control systems described above operate in the following manner. The temperature signals from the sensors 5, 6, 7 and, if suitable, the signal from the set-point control 8 are applied to the electronic controller 9 which responds by suitable energization of the immersion coil 21 via the line 22. This energization causes a positioning or movement of the immersion armature 20 which actuates the diaphragm 19 of the air pump 17' or 17", causing the generation of compressed air or vacuum in the air conduits 12, 13. The power or volumetric rate of the pump 17', 17" is adjusted by controlling the frequency of excitation of the coil 21. However, the electronic controller 9 may also change the stroke, i.e., amplitude, of the excursion of the armature 20. The pump 17', 17" is in direct pneumatic communication with the actuator 11 via the check valve 16, 16', whose purpose it is to prevent a change in the pressure or vacuum within the actuator 11. The throttle 15 tends to oppose the principal function of the pump 17', 17".

In a further feature of the invention, a feedback transducer, for example a potentiometer 28, is coupled to the actuator 11 or the air flap 4 to generate a position-related signal for the electronic controller 9, thus closing the control loop. If the controller 9 detects a difference between the set-point value and the actual value of the tempratures on the basis of signals from the sensors 5, 6, 7 and the control 8, the controller 9 converts that difference into an appropriate actuation signal which is delivered to the coil 21 for suitable energization of the coil to reduce the detected difference in signals by generating the required pressure or vacuum. This pressure or vacuum is transmitted via the check valve 16, 16' to the actuator 11. In the stationary state of the actuation system, pressure or vacuum generated by the pump 17', 17" is vented through the throttle 23. The actuation of the air flap 4 changes the prevailing temperature in the passenger compartment of the vehicle and the positioning of the air flap 4 is continued until the interior temperature sensor 6 determines that the temperature selected by the set-point control 8 has been attained.

The place and function of the fixed throttle 23 may be taken over by an electromagnetic valve 24 which changes the cross section of the conduit 14 under the control of a signal from the controller 9. If a fixed throttle 23 is employed, the air pump 17', 17" must operate continuously so as to maintain the required pressure or vacuum in the actuator 11. When a magnetic valve 24 is used, the air pump 17', 17" needs to be operated only when the position of the air flap 4 is changing but not when it has arrived in one of its terminal positions.

Referring now to FIGS. 4 and 5, two forms of controller 9, differing primarily in that control 24 is or is not used, is shown.

The combined input resistance designated as "RE" in FIGS. 4 and 5 forms the input signal to the controller 9. Resistance RE consists of several resistors arranged in series circuit, namely temperature sensors 5, and 7 as needed, set point control 8, and feedback potentiometer 28. Further, the controller 9 is connected with the current supply connections 10 and the control lines 22 for the pump coil 20, as described above.

Two variations for the control of the coil 21 are taught:

1. Linear frequency change in dependence on the input voltage of the input resistance RE, without use of the electromagnetic valve 24, which is shown in FIG. 4; and 2. Charging of the coil 21 with a constant frequency and impulse width modulation (PWM) for operation of the electromagnetic valve 24 as shown in FIG. 5.

In FIG. 4, the input resistance RE is part of a bridge circuit, which further consists of the fixed resistors R1, R2 and R3. The operational amplifier OP 1 works as a differential amplifier, whereby one input to the operational amplifier OP 1 is picked up between the resistors R2 and R3, which thereby forms a voltage divider. The other input to the operational amplifier OP 1 is connected between the bridge resistors RE and R1, with the interposition of a resistor R4. Further, the operational amplifier OP 1 is equipped with a negative feedback coupling resistor R6. An operational amplifier OP 2 is coupled to the outlet side of the operational amplifier OP 1; the former forms an analog switch together with the transistor T1 (in this case a field effect transistor (FET)), which in turn supplies the input signal for an operational amplifier OP 3. One input of the operational amplifier OP 2 is coupled via a resistor R7, and the other input to the operational amplifier OP 2 is coupled via a resistor R8, and both these inputs are off of the output of the operational amplifier OP 1. The field effect transistor T1 is placed between the input of the operational amplifier OP 2 (the resistor R8 is placed ahead of the input) and the minus power connection. The base of FET T1 is connected to the anode of a diode D1, the cathode of which is connected with the output of an operational amplifier OP 4, which is a Schmitt trigger.

One input of the operational amplifier OP 4 is wired to the resistors R15 and R16, and the other input is connected to the output of operational amplifier OP 3. The operational amplifier OP 3 works as an integrator because of its wiring to a condenser C1. The output of the OP 3 is connected, via resistor R17, to the input of an operational amplifier OP 5. The operational amplifier OP 5 is wired to the resistors R18, R19 and R20 on its other input. The output of the operational amplifier OP 5 is connected, via a resistor R21 and a diode D2 with the base of a transistor T2, the output at the collector of which is connected to control line 22 leading to coil 21, as described above.

The FIG. 4 circuit operates as follows:

The operational amplifier OP 1 creates a voltage $V_E$ dependent upon the input resistance RE, which is fed to the operational amplifier OP 2. Depending on the polarity of the initial voltage Vr of the Schmitt trigger (operational amplifier OP 4), the field effect transistor T1 either blocks or permits passage and creates a voltage at the operational amplifier OP 2, which is in turn integrated by the integrator (operational amplifier OP 3). As soon as the integrator reaches the threshold of the Schmitt trigger, the Schmitt trigger trips. An equation $f = k$ times $V_E$ can be derived for the oscillation frequency, wherein k is a constant. It can be derived from this equation that frequency f is proportional to voltage $V_E$. The delta voltage $V_D$ is created by the integrator (operational amplifier OP 3), is transformed into a rectangular voltage by the comparator (operational amplifier OP 5), which is fed to the transistor T2 connected on the output side. Referring to FIGS. 1 and 2, the pneumatic actuator 11 does not require negative or positive pressure during the desired maximal heat output, i.e. voltage $V_E$ is low, therefore also the frequency f, which causes the transistor T2 to block. As a result of a high voltage $V_E$ and a high frequency f the transistor T2 synchronously changes its switching modes, so that the coil 21 is either supplied with current or not. Because of the alternating movements of the armature 20, the airpump 17 supplies negative or positive pressure, which moves the air flap 4 to the position "heat off".

In FIG. 5, much of the input side wiring, including the operational amplifier OP 1, corresponds to the arrangement described above with respect to FIG. 4, and the same reference numerals are used again.

An operational amplifier OP 7 acts as a function generator because of its wiring in the circuit, and delivers at its output a delta voltage $V_D'$ of constant frequency. The frequency is determined by the capacity of condenser C3. The delta voltage is supplied to the input of an operational amplifier OP 8. The output side of OP 7 is connected, via the diode D3 and the resistor R42, with the input side of OP 8. Further, the output side of OP 7 is connected with the input side of OP 6 via the diode D3 and the resistor R41. Both operational amplifiers OP 6 and OP 8 act as comparators. The second input of the operational amplifier OP 6, via a resistor R33, is connected to the output of the operational of the operational amplifier OP 1; and the second input of the operational amplifier OP 8 is routed between the resistors R39 and R43, which forms a voltage divider. The operational amplifier OP 8 transforms the delta voltage $V_D'$ into a rectangular voltage $V_R'$ of constant amplitude and frequency, which controls the transistor T2 via the resistor R45. On the collector side, the transister T2 is connected with the control line 22 leading to the coil 21. A rectangular voltage is applied to the output of the operational amplifier OP 6, which is modulated in width according to the strength of the output voltage of the operational amplifier OP 1. This modulated rectangular voltage controls the transistor T3 via a resistor R37, whereby the through-put length of the transistor is dependent on the strength of the input voltage. The collector of the transistor T3 is connected to the control line 25 leading to the electro-magnetic valve 24, as described above.

The circuit described in FIG. 5 operates, in connection with the arrangement shown in FIGS. 1 and 2, as follows:

The coil 21 is charged with a current of constant frequency via the transistor T2 and steadily generates negative or positive pressure. In the "maximum heat" position, the output voltage of the operational amplifier OP 1 is low, as is the voltage of operational amplifier OP 6, so that transistor T1 blocks. The electromagnetic valve 24 causes the air line 12,13, and 14 to be pressurized, when the air pump 17 provides negative pressure, and causes it to be vented in case of a pump providing positive pressure. The pneumatic acutator 11 acts against its spring, which moves flap 4 into a position which exposes the entire cross-sectional area of heat exchanger 3. During normal heating, transistor T3 blocks or permits current flow and thereby switches the current for the electromagnetic valve 24 on or off as needed, so that modulated negative or positive pressure can be created, which constantly adjusts the air flap 4, via the pneumatic actuator 11, to a corresponding position. The position indication of the controller 9 is made via feedback potentiometer 28. In the heat "heat off" position, maximal negative or positive pressure is created by the switching on of the electromagnetic valve 24 via the transistor T3.

The above-described invention is subject to a number of variants. For example the function of the air flap 4 in an air conduit 29 may be taken over by a valve within, for example, the hot water circuit of the cooling system of the engine, to control the flow of hot water through the heat exchanger 3. The position of the hot water valve may be changed by the electronic controller 9 on the basis of the prevailing temperatures in a similar manner to that employed for changing the position of the flap 4.

In a variant of the invention, the air pump 17''' is a mechanically driven diaphragm pump. An electric drive motor 3 rotates an eccentric 31 which causes to-and-fro motions of a diaphragm-actuating rod. The speed of the drive motor 30 is regulated by suitable signals from the electronic controller 9 and maintains a continuous output of the air pump 17'''. The pump itself may be operated as a pressure pump or as a suction pump.

The above-described embodiments of the invention are subject to modifications, changes and combinations of features within the capabilities of persons skilled in the art without departing from the spirit and scope of the invention.

We claim:

1. In a temperature control apparatus including at least one temperature sensor means for generating a temperature signal, a controller means for generating a pump control signal as a function of said temperature signal, pump means for generating a fluid pressure in a conduit as a function of said pump control signal, and at least one actuator means connected to said conduit for positioning a control element located to control the flow of heat-carrying medium in the apparatus as a function of the pressure in said conduit, the improvement comprising:
    a restriction means in said conduit for continuously venting said conduit to atmosphere; and
    said controller means continuously generating pump control signals to continuously operate said pump means, once the system is powered, at selected capacities to maintain a pressure in said conduit sufficient to operate said actuator means to position said control element to a desired position with said restriction means continuously venting said conduit.

2. In a temperature control apparatus including at least one temperature sensor means for generating a temperature signal, a controller means for generating a pump control signal as a function of said temperature signal, pump means for generating a fluid pressure in a conduit as a function of said pump control signal, and at least one actuator means connected to said conduit for positioning a control element located to control the flow of heat-carrying medium in the appparatus as a function of the pressure in said conduit, the improvement comprising:
    a variable restriction means in said conduit for venting said conduit to atmosphere at a rate determined by a restriction control signal; and
    said controller means (a) generating electrical pump control signals and restriction control signals to operate said pump and to close said venting to create a pressure in said conduit to move said control element in a first operational direction, (b) generating restriction control signals to maintain said vent closed when said control element is at a desired position while maintaining said pump means deactivated, and (c) generating restriction control signals to open said restriction means to create a pressure in said conduit to move said control element in a second operational direction opposite said first operational direction while maintaining said pump means deactivated.

3. An apparatus according to claim 1 or 2, wherein said pump means is constructed to operate as a pressure-generating pump.

4. An apparatus according to claim 1 or 2, wherein said pump means is of an immersion armature-diaphragm type and has an exciter coil, the exciter coil of said pump means being electrically connected to an output of said controller and wherein said controller establishes the prevailing output power of said pump means by adjustment of the frequency or amplitude of the excursions of the diaphragm of the pump means.

5. An apparauts according to claim 1 or 2, wherein said pump means is a mechanically driven diaphragm pump operated by an eccentric rotated by an electric motor, and wherein said controller determines the operating power of said pump means by controlling the speed of said motor.

6. An apparatus according to claim 1 wherein said restriction means is a fixed reduced diameter.

7. An apparatus according to claim 1 wherein said restriction means is a variable restriction.

8. An apparatus according to claim 2, wherein said restriction means is an electromagnetic valve.

9. An apparatus according to claim 1 or 2, wherein said conduit contains a check valve.

10. An apparatus according to claim 1 or 2, further comprising a potentiometer connected to said control element for generating a position-related signal for use by said controller means.

* * * * *